(12) United States Patent
Atsmon et al.

(10) Patent No.: US 8,620,948 B2
(45) Date of Patent: Dec. 31, 2013

(54) SYSTEM AND METHOD FOR CROWDSOURCED TEMPLATE BASED SEARCH

(75) Inventors: Alon Atsmon, Ganei-Tikva (IL); Amir Shemer, Ramat-Gan (IL)

(73) Assignee: Alon Atsmon, Greenwich, CT (US)

( * ) Notice: Subject to any disclaimer, the term of this patent is extended or adjusted under 35 U.S.C. 154(b) by 154 days.

(21) Appl. No.: 13/030,347

(22) Filed: Feb. 18, 2011

(65) Prior Publication Data

US 2011/0202557 A1 Aug. 18, 2011

Related U.S. Application Data

(60) Provisional application No. 61/305,595, filed on Feb. 18, 2010.

(51) Int. Cl.
*G06F 17/30* (2006.01)
*G06Q 50/00* (2012.01)

(52) U.S. Cl.
USPC ........... 707/769; 707/736; 707/748; 707/804; 705/319

(58) Field of Classification Search
USPC ........... 707/769, 736, 748, 803–805; 705/319
See application file for complete search history.

(56) References Cited

U.S. PATENT DOCUMENTS

| 8,131,779 | B2 * | 3/2012 | Jonker et al. | 707/811 |
| 8,255,237 | B2 * | 8/2012 | Firminger et al. | 705/1.1 |
| 8,260,625 | B2 * | 9/2012 | Firminger et al. | 705/1.1 |
| 8,311,846 | B2 * | 11/2012 | Firminger et al. | 705/1.1 |
| 2010/0114691 | A1 * | 5/2010 | Wu et al. | 705/14.44 |

* cited by examiner

*Primary Examiner* — Cheryl Lewis

(57) ABSTRACT

A system and method for searching information based on crowd-sourced templates comprising a user input subsystem for entering one or more search terms, a database for storing a plurality of crowd-sourced templates, wherein each template is a representation of a data collection process from a plurality of sources. Subsequent search entries with tags results in display of stored templates in descending order of rank. Templates may be ranked using crowd voting or their social relevancy. Templates may be viewed, edited, and stored on the database by other users through social network sites.

16 Claims, 5 Drawing Sheets ized by the user: selects a template from the database; adds or changes the data source of the template; links fields in the template; manually or automatically adds tags to characterize the template; displays the mashup of the modified template to the user; and stores the modified template in the database.

SYSTEM AND METHOD FOR CROWDSOURCED TEMPLATE BASED SEARCH

PRIORITY CLAIM TO RELATED PROVISIONAL APPLICATION

The present application claims priority benefit under 35 U.S.C. §119 (e) to U.S. Provisional Patent Application Ser. No. 61/305,595, filed Feb. 18, 2010, entitled "System and Process for Searching Information". The present application incorporates the foregoing disclosure herein by reference.

BACKGROUND

1. Technical Field

The present invention relates to systems and processes for searching information based on crowd sourced templates 2. Discussion of Related Art The Information Age has heralded in a phenomenon of information overload for users conducting searches on the World Wide Web. There are a number of search engines that have been developed to facility the user's search, such as Bing "The Decision Engine", Google, and Yahoo.

There have also been a number of other inventions developed to facilitate information searches. For example, US Patent Application 20060116994 entitled "System and Method for Interactive Multi-Dimensional Visual Representation of Information Content and Properties" discloses an information retrieval system allowing information sources to be combined with selected user workflows and analytical content, dimensional relationships, and integrated analysis to display an interactive visual representation.

There are also many platforms that offer information search algorithms in use and known in the art. These platforms usually rely on either automatic ranking of relevant links or manual preparation of link lists. The prior art does not disclose, though, the use of crowdsourced templates to enable the public to use the search process done by other users The present invention provides the enhanced ability over the prior art for the user to efficiently tailor their information searches to their pre-selected preferences, thus saving time and energy. Their searches may then be shared and updated by a community of users.

SUMMARY OF THE INVENTION

Embodiments of the present invention provide a system for searching information based on crowdsourced templates. Accordingly, the present invention comprises: (i) user input subsystem for entering one or more search terms; (ii) a database for storing a plurality of crowdsourced templates, wherein each template is a representation of a data collection process from a plurality of sources.

According to some embodiments of the invention, the system further comprises the addition of tags generated manually or automatically affiliated with said retrieved template.

According to some embodiments of the invention, the sources comprise a plurality of network addresses.

According to some embodiments of the invention, hanging the information in at least one item stored within said database will change information in at least one other database item.

According to some embodiments of the invention, at least one template has a topic shown to a user.

In particular, the present invention provides a system and a method for a user to customize their information searches on the World Wide Web. The invention comprises a series of subsystems: 1) a subsystem for user input; 2) a subsystem for storing within a computer database files of preferred templates; and 3) a subsystem for retrieving a selected template from the database.

In a further aspect of the present invention, the subsystem of database storage of selected templates comprises a feature allowing the user to customize templates wherein the user: selects a template from the database; adds or changes the data source of the template; links fields in the template; manually or automatically adds tags to characterize the template; displays the mashup of the modified template to the user; and stores the modified template in the database.

In a further aspect of the present invention, the subsystem for conducting an information search comprises: the user inputting desired tags related to their search topic; the system retrieving a list of relevant templates from the database and displaying them in a specified order, such as descending order of relevancy, user preferred ranking, date, or a combination thereof; users selecting a template from the displayed list; user inputting desired search details into the template; the system conducts a mashup using link logic to change the information displayed in each of the information sources; and the system displays the results to the user.

In a further aspect of the present invention, the system and method may be utilized in a community computing environment wherein multiple users are permitted to view, share, rank, comment on, and modify template databases and search results.

These, additional, and/or other aspects and/or advantages of the present invention are set forth in the detailed description which follows; possibly inferable from the detailed description; and/or learnable by practice of the present invention.

BRIEF DESCRIPTION OF THE DRAWING

The present invention will now be described in the following detailed description of exemplary embodiments of the invention and with reference to the attached drawings, in which dimensions of components and features shown are chosen for convenience and clarity of presentation and are not necessarily shown to scale. Generally, only structures, elements or parts that are germane to the discussion are shown in the figures.

DETAILED DESCRIPTION OF SOME EMBODIMENTS

Provided herein is a detailed description of this invention. It is to be understood, however, that this invention may be embodied in various forms, and that the suggested (or proposed) embodiments are only possible implementations (or examples for a feasible embodiments, or materializations) of this invention. Therefore, specific details disclosed herein are not to be 5 interpreted as limiting, but rather as a basis and/or principle for the claims, and/or as a representative basis for teaching one skilled in the art to employ this invention in virtually any appropriately detailed system, structure or manner.

Prior to setting forth the detailed description, it may be helpful to set forth definitions of certain terms that will be used hereinafter As used herein, the term "template" refers to a reusable definition of input and output fields and the logical relations between them. For example an input fields of car make and year and output field of car models and their photos where choosing a make and/or model changes the available modes and their images.

As used herein, the term "logical link" refers to logical relationship between fields. For example choosing a car year in the year field will initiate a SQL query in a car database and present in the model filed only models of that year.

As used herein, the term "DB" refers to a database.

As used herein, the term "URL" refers to an address of a file or content on a computer network such as the internet. For example, the URL for NetAlert is www.netalert.gov.au As used herein, the term "mashup" refers to a web page or application that uses or combines data or functionality from two or many more external sources to create a new service. Mashups are templates.

As used herein, the term "crowdsourcing" refers to a task contributed by a large undefined large group of people through a public data network As used herein, the term "mobile device" refers to a computing device that is using a cellular network.

As used herein, the term "social network" is a web-based service that provides ways for users to interact, such as file sharing, blogging, and discussion groups, to build communities of people who have common interest. An example of a social network are Facebook.com and Linkedin.com.

Figure 1:
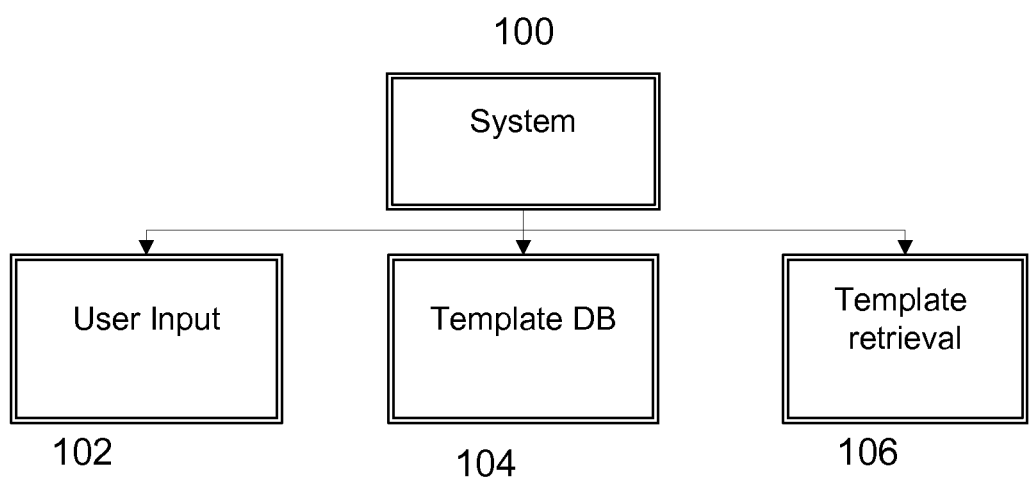
FIG. 1 is scheme of system modules in accordance with an exemplary embodiment of the invention.

FIG. 1 is scheme of system modules in accordance with an exemplary embodiment of the invention. System 100 is comprised of the following subsystems: 102—user input subsystem that allows a user to input the information he desires to receive, some of the processes performed by this subsystem are described in steps 304, 308, and 310 of FIG. 3; 104—template database subsystem, this subsystem enables for storing, recording, and updating of search templates as further described in steps 202-210, and 214 of FIG. 2 (Alternatively templates can be recorded by recording the actions performed by a user in searching for information in a similar way to Excel's macro recorder.); and 106—template retrieval subsystem which allows for retrieving 306 relevant templates form said DB. In a non limiting example, the Template DB is crowdsourced.

Figure 2:
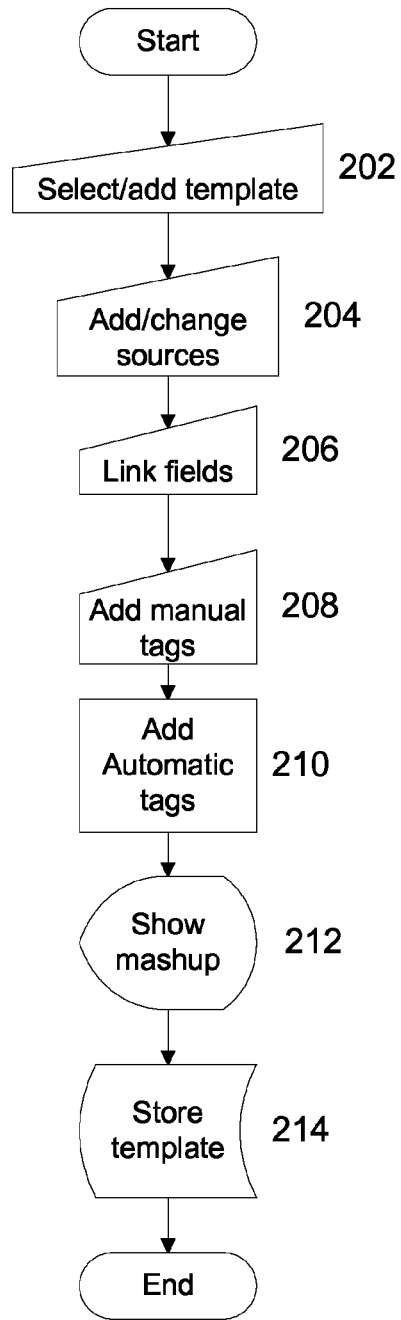
FIG. 2 is a flowchart of acts performed in adding or changing a template in accordance with an exemplary embodiment of the invention.

FIG. 2 is a flowchart of acts performed in adding or changing a template in accordance with an exemplary embodiment of the invention. The user selects 202 a current template or selects to add a new template and then: adds or changes 204 its data sources. These sources are comprised of:

Search engines such as www.google.com
Online marketplace such as www.ebay.com
Video sites such www.youtube.com, www.hulu.com
News feeds such as www.twitter.com
Manufacturers' sites such as www.Toyota.com
Governmental or municipal sites such as www.uspto.gov Later on the fields are linked 206 in said template, for example choosing a car model in one field will filter in only this model in the information they will present. Template tags can be added manually 208 to describe said template such as "car search"; and/or alternatively tags can be added automatically 210. For example a template with Toyota source can be automatically tagged as "cars". As shown in FIG. 2, 212—a mashup combines the selected templates with the tags, and as further described in FIG. 4. The altered template 214—is stored in the template database. The order of steps 202-214 is optional and others orders of the steps can results the same or similar results.

Figure 3:
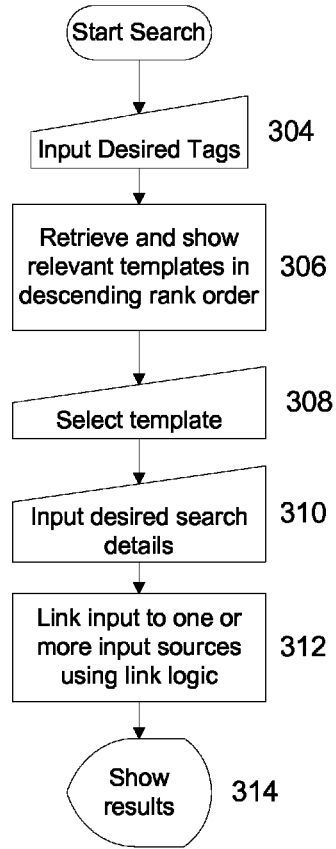
FIG. 3 is a flowchart of acts performed in searching a template in accordance with an exemplary embodiment of the invention.

FIG. 3 is a flowchart of acts performed in searching a template in accordance with an exemplary embodiment of the invention. User inputs 302 the search results he is interested in for example "Toyota car", the system retrieves 306 relevant templates from said template database, preferably in descending rank order such as descending order of relevancy, user ranking or date or a combination of them. The top relevant templates are shown and the user selects 308 the templates he likes. After selecting the desired template, user can input 310 the desired search results in said template for example select hybrids in a Toyota template. The system can then use the links created in step FIG. 2, 206 to change the information displayed in each of the sources (such as sources 402-412 of FIG. 4). The template results are then displayed in manner such as the one described in FIG. 4

Figure 4:
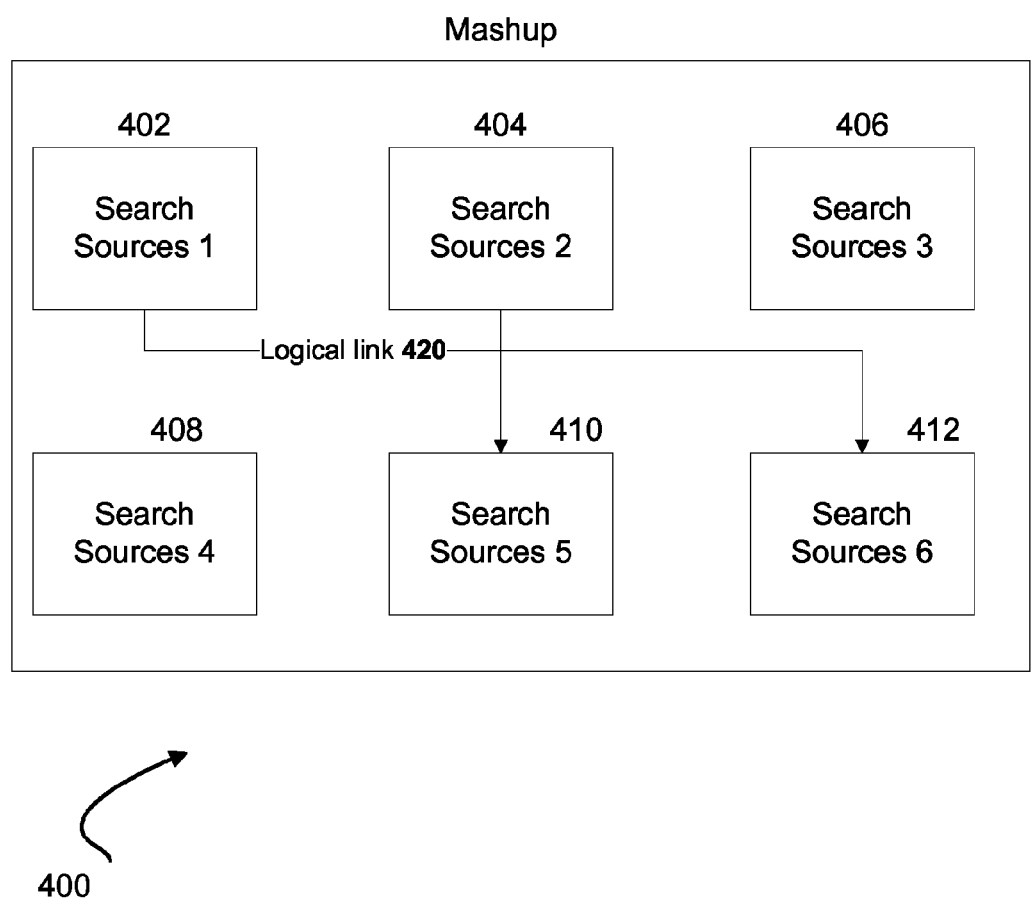
FIG. 4 is a scheme of a mashup in accordance with an exemplary embodiment of the invention.

FIG. 4 is a scheme of a mashup in accordance with an exemplary embodiment of the invention. Mashup 400 is comprised of one or more search sources 402-412, each of the sources can be of one of the types described in step 204, FIG. 2. Sources can have a logical link that describes relationships or actions. For example links 420 is set to change the car model displayed in sources 412 in response to a change in the card model of link 402. Each of the links retrieves information from a different (or identical) URL and displays it in place defined for it in the mashup. Optionally, the mashup is created by using a template.

In a non-limiting example, the mashup presents a process for choosing a low polluting car model, a process for choosing a house to purchase, or a process for choosing a bank with the lowest interest rate.

Figure 5:
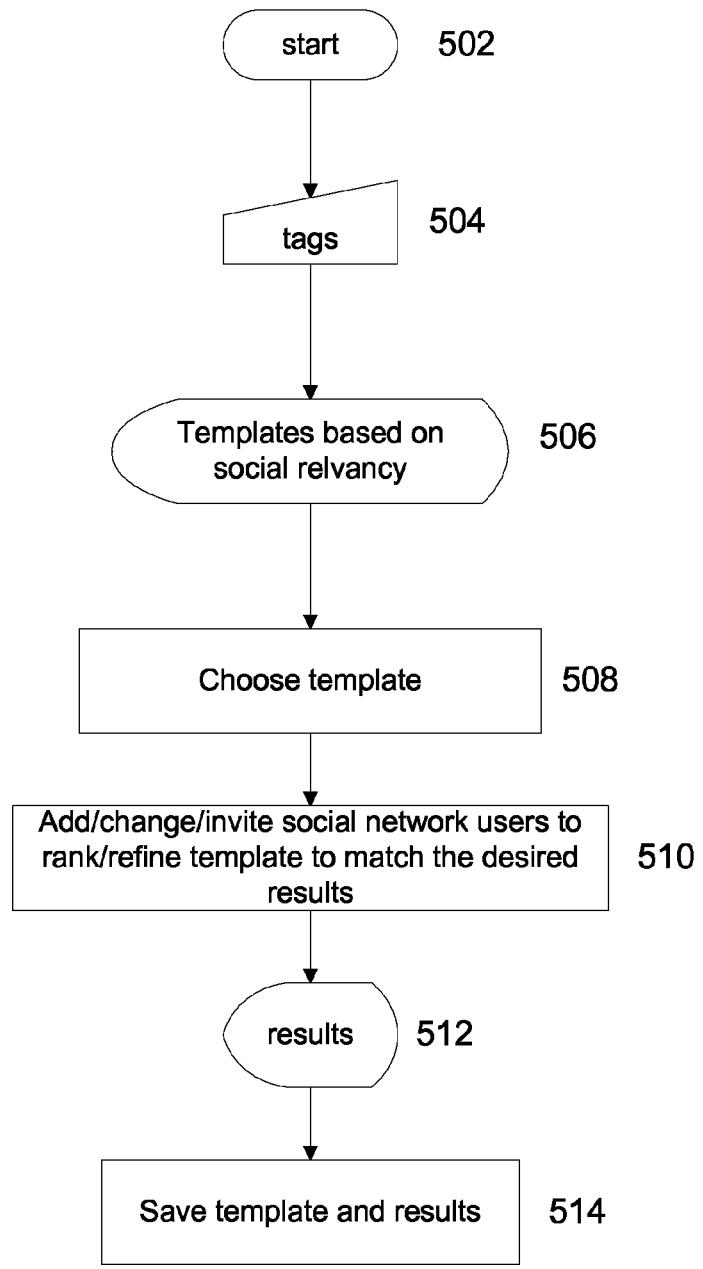
FIG. 5 is a flowchart of acts performed in adding or changing a social relevancy based template in accordance with an exemplary embodiment of the invention.

FIG. 5 is a flowchart of acts performed in adding or changing a social relevancy based template in accordance with an exemplary embodiment of the invention. User plans a ski vacation. The search for ski vacation will be based on combination of personal needs and constrains. User inputs 504 the desired results inputting combination of needs (such as tags) such as "ski" "mountain height", "family activity" and "distance from airport", "desired weather", etc. The system will provide various templates 506, which will match the desired tags 504, and in addition will show detailed social information on the users who built the templates. This social information (Facebook alike information—picture, name, age, friends, habits, social group, previous ski vacations, etc.), may help the said user to find similarity and match with other users and their shared experience, reducing search time, based on social match 508 and others personal experience. The chosen template may change, for example by adding additional parameter and can be ranked by other users 510, or said user may even ask other users to join and share more information to this template. The final outcome 512 is saved and can be shared for future use by the user and others 514.

Optionally, the actions described on steps 504 to 514, FIG. 5 are done on a social network platform. In a non-limiting example templates created by one's friends are ranked higher in ones searches shown in step 306, FIG. 3.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment", or "other embodiments", means that a particular feature, structure, or characteristic described in connection with the embodiments is included in at least some embodiments, but not necessarily all embodiments, of the inventions.

It is to be understood that the phraseology and terminology employed herein are not to be construed as limiting, and are for descriptive purposes only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting", and grammatical variants thereof do not preclude the addition of one or more components, features, steps, or integers; or groups thereof, and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques, and procedures by practitioners of the art to which the invention belongs.

The descriptions, examples, methods, and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents

What is claimed is:

1. A system for facilitating retrieval of information through a public data network, comprising:
   a user input subsystem for entering by a user one or more search terms;
   a database for maintaining a plurality of crowd-sourced search templates, each one of said plurality of crowd-sourced search templates having at least one logical link connecting between a plurality of search sources to be used when creating a mashup, said plurality of search sources being defined by a group of people through a public data network; and
   a subsystem which uses a computerized processor to retrieve a plurality of search results to said one or more search terms, said plurality of search results are acquired using a first of said crowd-sourced search templates and creates a mashup that combines said plurality of search results according to respective said at least one logical link of said first crowd-sourced search template.

2. The system of claim 1, further comprising a subsystem for adding by another user of a plurality of tags generated manually to any of said plurality of crowd-sourced search templates.

3. The system of claim 2, further comprising a display which displays said mashup.

4. The system of claim 3, further comprising an additional subsystem permitting additional system users to store in said database an additional crowd-sourced search template.

5. The system of claim 1, wherein said plurality of search sources comprise a plurality of network addresses.

6. The system of claim 1, wherein changing the information in at least one item stored within said database will change information in at least one other database item.

7. The system of claim 1, wherein at least one of said plurality of crowd-sourced search templates has a topic shown to said user.

8. The system of claim 1, further comprising a ranking subsystem of which ranks said plurality of crowd-sourced search templates according to input provided by a plurality of users.

9. The system of claim 1, further comprising a subsystem for searching for said templates using search terms and displaying the relevant templates in descending order of ranking.

10. The system of claim 1, further comprising a subsystem for searching for said templates using search terms and displaying the relevant templates in descending order of relevancy.

11. A method for processing queries in a search and retrieval system, said method comprising the steps of:
   maintaining a database of a plurality of crowd-sourced search templates, each one of said plurality of crowd-sourced search templates is created by:
   receiving a plurality of search sources from a plurality of different users through a public data network, and defining at least one logical link which connects at least some of said plurality of search sources to be used when creating a mashup;

accepting one or more search terms from an additional user, through an interface;

retrieving a plurality of search results to said one or more search terms using a first of said crowd-sourced search templates; and creating a respective said mashup that combines said plurality of search results according to respective said at least one logical link of said first crowd-sourced search template.

12. The method of claim 11, wherein said first one of said plurality of crowd-sourced search templates edited by a certain user and ranked based on social relevancy of said additional user to said certain user.

13. The method of claim 12, wherein said first crowd-sourced search template is indicative of a social relevancy between said additional user and said certain user.

14. The method of claim 11, wherein said one or more search terms are manually or automatically entered Internet tags.

15. The method of claim 11, wherein said creating comprises retrieving information from a plurality of different uniform resource locators (URLs) defining said plurality of search resources and displaying said information in place defined for it in said mashup.

16. The method of claim 11, wherein said at least one logical link defines a logical relationship between a plurality of fields of different search sources from said plurality of search sources.

* * * * *